Feb. 7, 1961    M. E. JENSEN    2,970,710
ATTACHMENT FOR SPREADER
Filed March 14, 1957    2 Sheets-Sheet 1
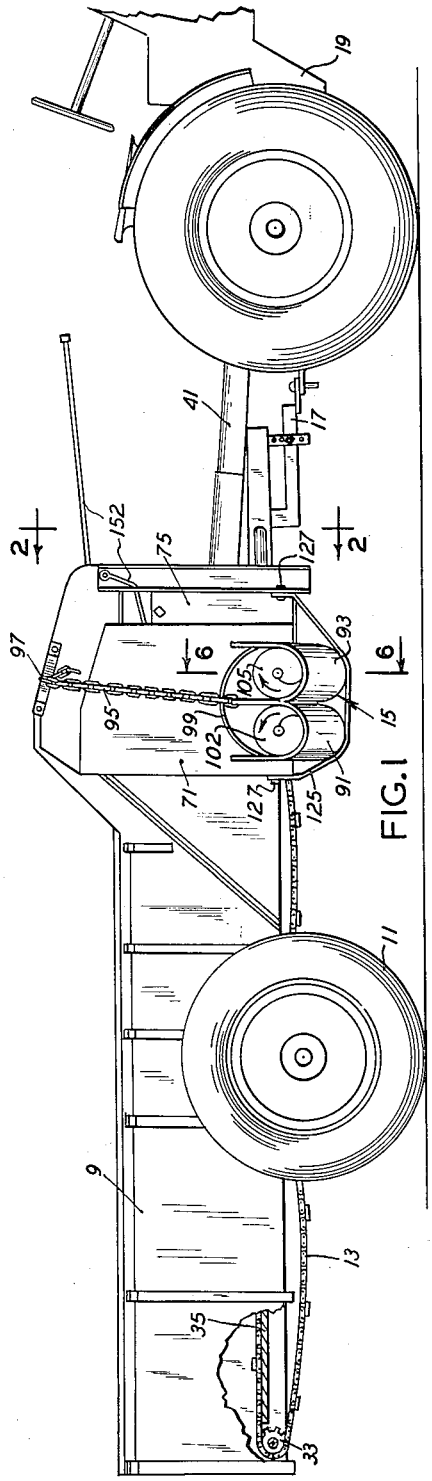
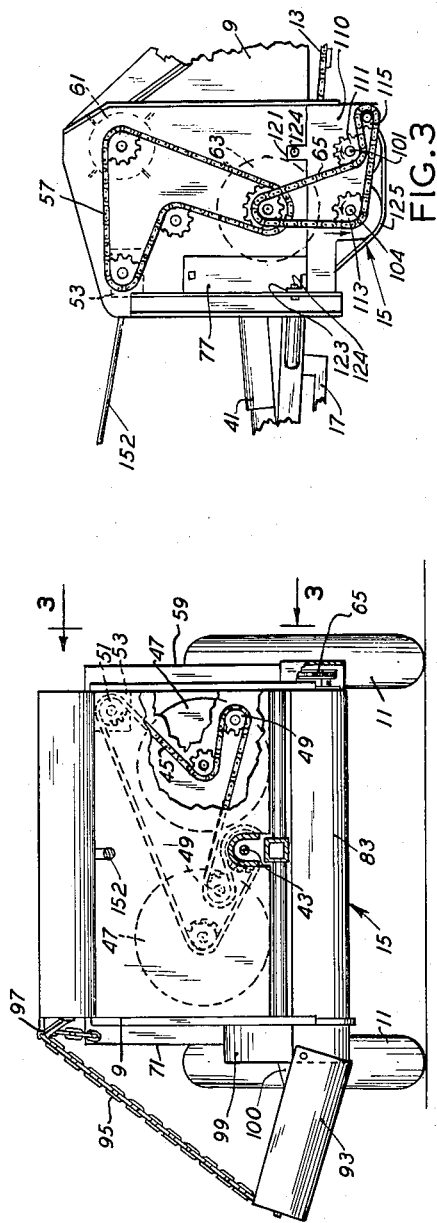
INVENTOR.
MELVIN E. JENSEN
BY
Buckhorn, Cheatham & Blore
ATTORNEYS

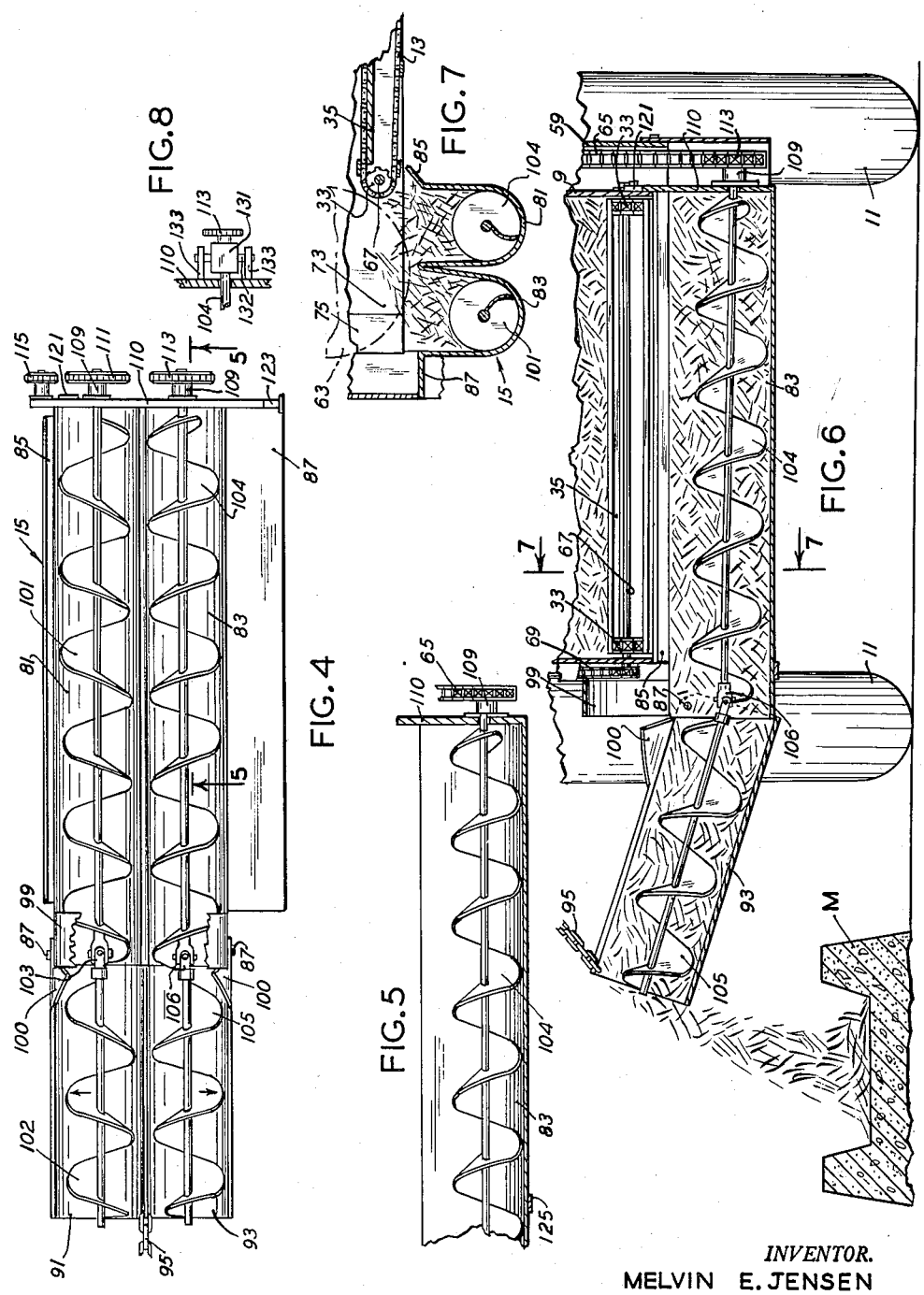

United States Patent Office 2,970,710
Patented Feb. 7, 1961

2,970,710

ATTACHMENT FOR SPREADER

Melvin E. Jensen, Rte. 2, Nyssa, Oreg.

Filed Mar. 14, 1957, Ser. No. 646,059

2 Claims. (Cl. 214—519)

This invention relates to conveying or distributing devices, particularly to devices of this type for use on farms for filling long troughs or mangers with feed for animals such as cattle, horses, pigs and the like. For convenience, hereinafter the term "manger" will be used to designate a feed trough or manger.

Heretofore, the above-described operation has usually been performed by manually dumping feed into a manger from a truck, wagon or similar vehicle driven or drawn alongside the manger.

It is a main object of the present invention to provide an improved apparatus for filling mangers and the like, and particularly to such an apparatus which does not require manual dumping or handling of the feed.

A more specific object of the invention is to provide an attachment for a conventional spreader by which the spreader may readily be converted to a lateral feeding device for filling mangers and the like.

A more general object of the invention is to provide an improved feeding or conveying apparatus of the auger or screw type which is so constructed that the apparatus may readily handle particled solid material without clogging or binding of the auger or screw.

A further object is to provide a feeding apparatus of the auger or screw type constructed so that the delivery end thereof may be adjusted relative to the supply end for more accurate delivery of the material being handled.

In the specific form shown, the present invention comprises an attachment for a spreader, the attachment including a laterally extending conduit in the form of a pair of side-by-side troughs containing a pair of augers or screws which rest loosely within the troughs. The troughs and augers are formed of pivotally connected sections permitting vertical adjustment of the delivery ends of the troughs.

Various other objects of the invention will be apparent from the following description taken in connection with the accompanying drawings wherein:

Fig. 1 is a side view of a conventional spreader having an attachment of the present invention thereon, the spreader being drawn by a farm tractor;

Fig. 2 is a vertical sectional view taken along line 2—2 of Fig. 1;

Fig. 3 is a fragmentary side elevational view taken in the direction of the arrows 3—3 in Fig. 2 showing certain drives;

Fig. 4 is a plan view of the attachment in an empty condition and on an enlarged scale, parts being broken away for convenience in illustration;

Fig. 5 is a vertical section taken along line 5—5 of Fig. 4;

Fig. 6 is a vertical section taken along line 6—6 of Fig. 1, the view being on an enlarged scale;

Fig. 7 is a vertical section taken along line 7—7 of Fig. 6, the view being taken transversely of the attachment but longitudinally of the machine; and Fig. 8 is a fragmentary horizontal section showing a modified form of the invention.

Referring to Fig. 1, the apparatus disclosed includes a conventional spreader comprising a box 9 supported by wheels 11 and equipped with a longitudinal conveying means in the form of an apron raddle 13 for conveying particled material such as feed from the left-hand or rear end to the right-hand or front end of the box. An attachment generally entitled 15, which embodies the concepts of the present invention, is detachably mounted on the underside of the box at the front end thereof for conveying particled material laterally of the box and depositing it to one side of the path of travel along which the spreader is driven. The spreader has a hitch 17 connected to a farm tractor 19 by which the spreader is drawn.

The spreader disclosed is illustrative of one type of apparatus with which the attachment of the present invention can be employed. It is here pointed out that the attachment of the present invention can be secured to the conventional spreader without modification thereof, other than a bolt hole or two, and that after the attachment is removed the spreader can fuction in its intended manner.

In order to fully understand the relationship of the attachment 15 to the spreader, it will be necessary to explain part of the construction of the spreader. The raddle 13 is trained around spaced sprockets 33 at the opposite ends of the box as is best shown in Figs. 1, 6 and 7, and has the upper run or reach thereof moving over a floor 35 of the box 9. The raddle 13, as well as the other moving instrumentalities of the spreader, may be driven in any suitable manner, such as from the wheels 11, or from a power take-off arrangement from the tractor 19. In the particular spreader shown a power take-off unit 41 from the tractor is employed. In order to explain the drive from the power take-off to the raddle 13, it will be necessary to refer to certain other parts first.

Referring particularly to Fig. 2, the power take-off unit has a drive shaft 43 driving an endless chain 45 which is trained about a sprocket on the take-off shaft and about sprockets on a pair of slingers 47, rotatably mounted on the box 9, and also about idler sprockets 49 and about a sprocket 51 on a bevel gear box 53.

Referring to Fig. 3, the gear box 53 drives a second endless chain drive 57 which is concealed in Fig. 2 by a cover 59. The chain 57 drives an upper beater 61 and a lower beater 63 through suitable sprockets on the shafts of these beaters. A third endless chain drive 65 extends between the shaft of the lower beater 63 and the attachment 15, for driving the same in a manner to be more fully explained presently.

The raddle assembly includes a front shaft 67, as shown in Figs. 6 and 7, which is driven by a drive assembly including a chain drive 69 and a conventional ratchet mechanism, not shown, which is driven by the shaft of the upper beater. The ratchet mechanism is concealed in Fig. 1 by the cover 71.

From the description so far given, it is apparent that the particled material in the box 9 will be conveyed forwardly by the raddle 13 and that the beaters 61 and 63 will perform their usual functions of shredding and directing the material toward the slingers 47.

The box 19 has an outlet at the forward end thereof including an opening 73 as shown in Fig. 7 in the floor 35 of the box and also openings at either side of the box which are concealed by removable shields or cover plates 75 and 77, compare Figs. 1 and 3. The slingers 47 are laterally aligned with such side opening and normally the slingers 47 are responsible for slinging the particled material through the outlet, comprising the bottom and side openings, to scatter the material over a wide path along which the spreader is pulled. However, in the present invention the cover plates 75 and 77 present sidewise swinging of the particled material so that the only egress for the material is through the bottom opening 73.

Enclosing the bottom opening 73 is the inner portion of the attachment 15 which comprises an inner trough unit composed of two fixed inner sections 81 and 83 secured together in side-by-side relation. Referring to Fig. 7, the trough sections 81 and 83 have semi-cylindrical bottom walls and straight upwardly extending side portions terminating in flanges 85 and 87, respectively, which are of sufficient size to close the opening 73 in the floor 35.

The attachment includes an outer trough unit composed of two trough sections 91 and 93 forming continuations of the inner sections 81 and 83, respectively. The outer sections fit under the inner sections and are pivoted by pivots 87 to the inner trough sections. The outer trough unit is supported by a chain 95 adjustably secured at 97 to the upper side portion of the box 9. A curved detachable flexible shield 99 is secured to the side walls of the inner trough unit at the place it projects beyond the box 9 to retain feed from being thrown out of the troughs at such place. Ears 100 are provided on the inner end of the outer trough unit to also serve as feed retainers.

Cooperatively fitting within the trough composed of trough sections 81 and 91 is a left-hand feed screw or auger including an inner section 101 and an outer section 102 connected by a universal joint 103 at the location of the trough pivots 87. Cooperatively fitting within the trough composed of the trough sections 83 and 93 is a right-hand feed screw or auger including an inner section 104 and an outer section 105 connected by a universal joint 106.

The augers or feed screws may therefore be considered as being articulated at least at one place therealong, namely at the location of the pivots 87, and the troughs may be considered as conduits which are articulated at least at one place therealong, namely at the location of the pivots 87.

Referring to Figs. 3 and 4, the shaft of each auger section is journaled in a bearing 109 on a trough end plate 110 and is driven by the chain 65, previously mentioned. The shaft for auger section 101 has a sprocket 111 fixed thereon and the shaft for the auger section 104 has a sprocket 113 fixed thereon. The chain 65 is trained downwardly and under each sprocket on the same side of each and then around an idler sprocket 115 so that the feed screws are driven in opposite directions as is clearly shown by the arrows in Fig. 3. Referring to Fig. 4, it is clear that the upper portions of the screws or augers move outwardly in opposite directions from one another.

The attachment is detachably secured to the box 9 as follows. The inner trough unit is equipped with a pair of tabs 121 and 123 on the inner end thereof, as best shown in Fig. 3, and bolts 124 secure these tabs to the box 9. As shown in Fig. 1, the opposite end of the inner trough unit is supported by a strap 124 which is secured at its ends by bolts 127 to the box 9.

The journaling of the auger shafts in the bearings 109 on the trough constitutes the only journaling means for the feed screws, and the usual tolerances of the parts are such that the journaling may be considered as rather loose so that the main portions of the feed screws freely rest on the inner bottom walls of the trough sections to be supported thereby.

This construction is important for several reasons. It prevents clogging of the feeding assembly, because if a journal were located along the length or at the outer end of an auger, it would necessarily have to be connected by a bracket to the trough. Thus the material being fed could be packed against such brackets and journals. Also, the just referred to manner of supporting the augers or screws would hold them in fixed positions relaive to the trough sections. Thus if the material being handled sticks to the walls of the trough sections, the augers or screws tend to bind because of such accumulated material. However, there is no binding with the feed screws of the present invention, because the bearings for the screws will allow the feed screws to ride up and over the accumulated material, and the continuous rotation of the feed screws will gradually wear down the packed material. It is further pointed out that the sides of the troughs rise substantially higher than the upper surfaces of the feed screws so that the feed screws can rise and fall within the troughs without the upper surfaces of the feed screws rising beyond the upper edges of the troughs.

By having the single journal arrangement referred to above, ready adjustment of the outer sections of the feed troughs relative to the inner sections is possible, since upon adjustment of the outer trough sections, the outer feed screw sections can move longitudinally relative thereto as the geometry of the parts requires. Thus by adjusting the length of the chain 95, the delivery end of the outer trough unit may be positioned at a height just above the particular manger M into which the feed is to be deposited to avoid loss of feed.

The left-hand and right-hand feed screws cooperate to convey feed outwardly and are rotated so as to urge the feed against the central walls of the trough units rather than against the side walls. Thus although the augers are exposed by the troughs, the feed does not spill out over the side walls of the trough units.

To convert the machine to a spreader, the drive chain 65 is removed, the support chain 95 disconnected from the box 9, the inner trough section unbolted from the box, and the cover plates 75 and 77 are removed. This may be done in a matter of minutes. The reverse operation may be performed in a similar period of time. Thus the spreader may be converted to a lateral feeder without any major alteration thereof except for the provision of a few bolt holes.

The material handled by the subject machine has been referred to as "feed," as this is definite as far as the particular operations described. It is obvious, however, that the machine is capable of handling a wide variety of particled solid materials. A conventional control mechanism 152 enables the operator to regulate the speed of the raddle 13 or stop the raddle.

Fig. 8 shows a modified form of journaling means for the augers. The shaft for auger section 104 is shown journaled in a bearing 131 having trunnions 132 in ears 133 on the end plate 110. The opening in end plate 110 for the shaft is oversize so that the shaft may shift relative to the end plate as required by the auger sections.

Having described the invention in what is considered to be the preferred embodiment thereof, it is desired that it be understood that the invention is not to be limited other than by the provision of the following claims.

I claim:

1. In combination with a spreader of the type including a wheeled vehicle having a box for containing the material to be handled, said spreader also having means for conveying said material from the rear end to the front end of said box in a direction longitudinally of said vehicle, said box having outlet openings in the bottom and sides thereof at said front end and means mounted on the front end wall of said box for slinging material through said bottom and side outlet openings, a lateral feeding attachment for said box, said attachment comprising an open top trough member, means detachably securing said trough member to the underside of said box to receive material from the bottom opening, said trough member having a portion disposed in contiguous relation to the bottom of said box at the rear edge of said bottom opening and another transverse portion disposed in contiguous relation with respect to the front end wall of said box to confine the material leaving said box to entry into said trough member, and separate plates detachably secured over the side outlet openings of said box to close the same and confine the material leaving said box to entry into said trough member, said trough member having a pair of ears at the inlet end thereof bolted to the side of said box adjacent the inlet end of said trough member, a strap at the opposite side of said box extending beneath said trough member and bolted to said box whereby said trough member may be removed by unbolting said ears and strap, and upon removal of said separate plates, said spreader may be operated in its original form.

2. In combination with a spreader of the type including a wheeled vehicle having a box for containing the material to be handled, said spreader also having means for conveying said material from the rear end to the front end of said box in a direction longitudinally of said vehicle, said box having outlet openings in the bottom and sides thereof at said front end and means mounted on the front end wall of said box for slinging material through said bottom and side outlet openings, a lateral feeding attachment for said box, said attachment comprising an open top trough member, means detachably securing said trough member to the underside of said box to receive material from the bottom opening, said trough member having a portion disposed in contiguous relation to the bottom of said box at the rear edge of said bottom opening and another transverse portion disposed in contiguous relation with respect to the front end wall of said box to confine the material leaving said box to entry into said trough member, and separate plates detachably secured over the side outlet openings of said box to close the same and confine the material leaving said box to entry into said trough member, said trough member having detachable means at the inlet end thereof connected to the side of said box adjacent the inlet end of said trough member, other detachable means at the opposite side of said box connecting said box to said opposite side whereby said trough member may be removed by detaching the detachable means, and upon removal of said separate plates said spreader may be operated in its original form.

References Cited in the file of this patent

UNITED STATES PATENTS

| | | |
|---|---|---|
| 2,298,332 | Applegate | Oct. 13, 1942 |
| 2,548,134 | Turner | Apr. 10, 1951 |
| 2,676,002 | Wolfe | Apr. 20, 1954 |
| 2,731,969 | Hoeksema | Jan. 24, 1956 |
| 2,743,832 | Kappelmann | May 1, 1956 |
| 2,771,203 | Collins et al. | Nov. 20, 1956 |
| 2,772,796 | Hansen | Dec. 4, 1956 |
| 2,783,906 | Helms | Mar. 5, 1957 |